United States Patent

[11] 3,620,697

| [72] | Inventors | Donald K. Wunderlich Richardson;<br>Finis E. Carleton, Richardson; Eugene R. Brownscombe, Dallas, all of Tex. |
|---|---|---|
| [21] | Appl. No. | 13,370 |
| [22] | Filed | Feb. 24, 1970 |
| [45] | Patented | Nov. 16, 1971 |
| [73] | Assignee | Atlantic Richfield Company<br>New York, N.Y. |

[54] APPARATUS AND METHOD FOR PRODUCING HYDROGEN
12 Claims, 2 Drawing Figs.

[52] U.S. Cl............................................ 48/89,
23/212 A, 23/288 S, 48/99, 48/102, 48/120,
48/202, 48/206, 48/211, 252/373
[51] Int. Cl...................................................... C10j 3/14,
C10j 3/00

[50] Field of Search............................................ 201/31,
48/214, 206, 63, 202, 99, 89, 120, 211, 102;
23/288.3 S, 212 A, 252/373

[56] References Cited
UNITED STATES PATENTS

| 2,714,059 | 7/1955 | Bearer...... | 48/214 |
| 2,738,262 | 3/1956 | Benz et al...... | 48/214 X |
| 2,884,303 | 4/1959 | Metrailer...... | 48/206 X |
| 3,192,018 | 6/1965 | Minami...... | 23/288.3 S |

Primary Examiner—Joseph Scovronek
Assistant Examiner—R. E. Serwin
Attorneys—Blucher S. Tharp and Roderick W. MacDonald ABSTRACT: Apparatus and method for producing hydrogen utilizing an inert particulate material as a heat transfer medium, fluidizing the particulate material to convey same to the reaction zone wherein, inter alia, hydrogen is formed, and heating the particulate material while so conveyed.

PATENTED NOV 16 1971     3,620,697

INVENTORS
DONALD K. WUNDERLICH
FINIS E. CARLETON
EUGENE R. BROWNSCOMBE

Roderick W. MacDonald
ATTORNEY

APPARATUS AND METHOD FOR PRODUCING HYDROGEN

BACKGROUND OF THE INVENTION

Heretofore water gas (a mixture of hydrogen and carbon monoxide) has been produced utilizing inert particulate material as a heat transfer medium wherein the particulate material was conveyed by a mechanical elevator system to a heating zone which was disposed above the water gas generation zone and which had a cooling chamber disposed below the water gas generation zone. The mechanical elevator was a cumbersome and inefficient means for conveying the particulate material and it is inefficient from a thermal conservation viewpoint to have to cool the particulate material before it is passed to the mechanical elevator. Further, by having a heating chamber above the water gas generation zone, some of the heating gases used are entrained downward with the particulate material into the water gas generation zone thereby contaminating the water gas formed in that zone and reducing the quality of the water gas recovered. The method and apparatus just described are disclosed in U.S. Pat. No. 1,977,684, the disclosure of which is incorporated herein by reference.

SUMMARY OF THE INVENTION

According to this invention there is provided a method and apparatus for producing hydrogen wherein an inert particulate material is employed as a heat exchange medium but wherein the particulate material is not deliberately cooled after removal from the hydrogen generation zone. According to this invention the still warm particulate material is returned for reuse in the hydrogen generation zone by fluidizing same and heating the fluidized particulate material as it progresses back to the hydrogen generation zone for reentry thereinto.

Further, provision is made for separating gases from the heated particulate material before it is reintroduced into hydrogen zone, thereby keeping the contamination of the hydrogen containing product generated to a minimum and increasing the quality of the hydrogen containing product produced.

By this invention a more efficient conveying mechanism for the particulate material is employed and the heating of the particulate material is accomplished during conveying of same. At the same time, deliberate cooling of the particulate material after it is removed from the hydrogen generation zone is eliminated so that the heat of the particulate material, as removed from the hydrogen generation zone, is conserved in the system. This reduces heating costs for the particulate material before it is reintroduced into the hydrogen generation zone.

Thus, this invention eliminates undesired cooling of the particulate material, provides a more efficient mode of conveyance for the particulate material, provides for heating the particulate material while conveyed thereby eliminating a separate preheating step for the particulate material, and degasifies the particulate material before introduction into the hydrogen generation zone thereby providing for a more pure product.

Accordingly, this invention provides apparatus for producing hydrogen wherein a reaction chamber is operatively connected to a closed conveying-heating chamber, the conveying-heating chamber having means for fluidizing the particulate material therein to lift same through the conveying-heating chamber for reintroduction into the reaction chamber, the conveying-heating chamber also having means for introducing material for heating the particulate material while it is conveyed through the conveying-heating chamber. There is also provided means for removing gas associated with the heated particulate material after passing through the conveying-heating chamber and before the heated material is reintroduced into the reaction chamber.

Also according to this invention there is provided a method for producing hydrogen wherein an inert particulate material is employed as a heat transfer medium and this material is conveyed to the reaction zone wherein the hydrogen is produced, mixing a carbonaceous material with the fluidized particulate material, providing heat to initiate the burning of the carbonaceous material, heating the particulate material while it is being conveyed to the reaction zone, and separating gases associated with the heated particulate material before introduction of same into the reaction zone.

Accordingly, it is an object of this invention to provide a new and improved apparatus for producing hydrogen. It is another object to provide a new and improved apparatus for conveying and heating particulate material prior to introduction of same into a reaction chamber. It is another object to provide a new and improved apparatus for conveying and heating particulate material, and separating gases therefrom before introduction into a reaction chamber. It is another object to provide a new and improved method for producing hydrogen. It is another object to provide a new and improved method for producing a purer hydrogen-containing product substantially uncontaminated by gases employed and/or present in a preheating process step. It is another object to provide a new and improved method for conveying and heating particulate material prior to introduction of same into a reaction zone. It is another object to provide a new and improved method for conveying, heating, and degasifying particulate material before introduction of same into a reaction zone. It is another object to provide a new and improved method for generating water gas or thermally cracking a hydrocarbon to produce hydrogen.

Other aspects, objects, and advantages of this invention will be apparent to those skilled in the art from this disclosure and the appended claims.

DETAILED DESCRIPTION OF THE INVENTION

Figure 1:
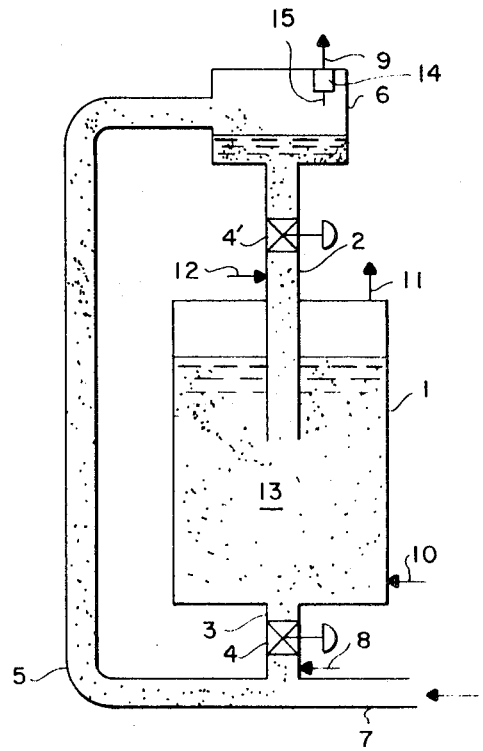
FIG. 1 shows apparatus embodying this invention.

More specifically, FIG. 1 shows a reaction chamber (zone) 1 having operatively connected thereto first conduit means 2 and second conduit means 3. Both conduit means have a conventional valve means 4' and 4 operatively connected thereto to help in regulating the flow of material therethrough. At the lower end of conduit 3, there is connected thereto a curvilinear conveying-heating chamber (zone) 5 which serves as a riser and operatively connects at its upper end to an accumulation chamber (zone) 6.

Conveying-heating chamber 5 has operatively connected thereto a conduit means 7 for the introduction of material into chamber 5 as described hereinafter.

Second conduit 3 has at least one conduit (pipe) means 8 operatively connected thereto for the introduction of material into conduit 3 as described hereinafter.

Accumulation chamber 6 has operatively connected thereto by way of pipe 15 a conventional cyclone dust separator or other known solid-gas separator 14 for the removal of solids from the gas passing from chamber 6 out vent 9. The solids are removed from separator 14 through an outlet (not shown) which extends externally of chamber 6.

Reaction chamber 1 has operatively connected thereto in the lower portion thereof at least one conduit means such as a pipe 10 for the introduction of material into the interior chamber 1 as described hereinafter and at least one conduit means such as pipe 11 operatively connected to an upper portion thereof for the removal of reaction products from chamber 1.

In operation, the method and apparatus of this invention can employ substantially any material which is substantially inert to the reactants of the method and which can be subdivided sufficiently to be capable of being fluidized and conveyed in the fluidized state.

Generally, the particulate material should be substantially refractory so as to withstand the high temperatures of the water gas reaction without disintegrating or otherwise thermally decomposing. Various refractory material in the form of small spheres or irregularly shaped particles can be employed. These spheres or particles or other shaped particles can have an average size of at least about plus (retained on) 400 mesh (U.S. Standard sieve), there being no real maximum size other than the limitation that the particles be capable of being fluidized and conveyed in the fluidized state. Generally, particles of from about plus 200 mesh to about minus (pass through) 20 (both U.S. Standard sieves) can be employed.

The particulate material can be composed of any substantially inert material such as, for example, alumina, beryllia, zirconia, mullite, periclase, silicon carbide, clays, silicates, synthetic metal oxide gels, metals (including alloys of two or more metals), combinations of two or more of the foregoing, and the like. A particularly useful material would be sand in its normally occurring particle size range. Other inert refractory materials obvious to those skilled in the art can also be employed in this invention in any size range so long as they can be fluidized for conveying purposes.

The water gas reaction is one of reacting 1 mole of carbon with 1 mole of water to produce 1 mole of carbon monoxide and 1 mole of hydrogen. This reaction is endothermic and in this invention the heat required is provided by the sensible heat of the particulate material. Substantially any carbon source can be employed so that the invention is applicable to carbonaceous material, be it solid (e.g., in the form of coal) or substantially liquid (e.g., in the form of crude oil, crude oil residue, asphalt, and the like). Generally, it is preferred to employ subdivided coal, coke, coal char, and the like. The water reactant is normally provided in the form of steam although mixtures of steam and liquid water can be employed if desired.

A hydrocarbon such as those having from one to 10, inclusive, carbon atoms per molecule can be employed in lieu of a carbonaceous material in chamber 1. In this situation the hydrocarbon is thermally cracked to form hydrogen and to leave a carbonaceous deposit on the particulate material to be burned in chamber 5 alone or with additional externally introduced carbonaceous material. For example, methane and steam can be introduced into chamber 1, the methane thermally cracked to hydrogen and to carbon which deposits on the particulate material. The hydrogen is recovered from chamber 1 and the particulate material with carbon is passed to chamber 5 wherein the carbon is burned alone or with additional carbonaceous material to heat the particulate material for reentry into chamber 1.

In the apparatus of FIG. 1, a dynamic equilibrium is set up by the regulation of valves 4' and 4 so as to provide for the presence of particulate material in chamber 1 with a steady stream of particulate material flowing through second conduit 3 into conveying-heating chamber 5. The particulate material in chamber 5 is fluidized by the introduction of oxidizing and fluidizing gas such as air, oxygen, and the like, through conduit 7. Fuel can be introduced into chamber 5 by way of conduit 7 or by way of a separate conduit means (not shown) operatively connected to chamber 5 and/or operatively connected to second conduit 3 such as pipe 8. Carbonaceous material such as the carbonaceous fuel utilized in chamber 1 for the production of hydrogen (if hydrocarbon was not used for the hydrogen source) can be added by way of pipe 8 so that a mixture of fuel and oxidizing gas is present in chamber 5 together with the hot fluidized particulate material. The heat of the particulate material, because it is not deliberately cooled after leaving the reaction chamber 1, can be sufficient to cause ignition of the carbonaceous material from pipe 8. The oxidation of the carbonaceous material is accomplished in chamber 5 and is exothermic so that the particulate material present during this oxidation process is substantially completely heated before entering chamber 6. If additional heat is desired in chamber 5, the material in pipe 7 and/or 8 can be heated as desired or other preheated material can be introduced into chamber 5 by way of a separate pipe or pipes (not shown) in chamber 5 and/or in second conduit 3.

The heated mixture of particulate material and gas issuing from chamber 5 into chamber 6 is separated by way of vent means 9 and 14 so that gas associated with the particulate material in chamber 5 is separated from the particulate material before the particulate material passes through first conduit 2 into reaction chamber 1. The separation of gas from the heated particulate material is desirable when the oxidizing-fluidizing gas in chamber 5 is air since it is difficult to separate nitrogen from hydrogen and therefore desirable not to introduce nitrogen into reaction chamber 1 since the nitrogen will be removed together with the hydrogen product from the reaction chamber by way of pipe 11. By separating nitrogen and other gases by vent means 9 and 14 the reaction products of carbon monoxide and hydrogen removed by way of pipe 11 from reaction chamber 1 will be a more pure product and costly separation procedures which would be necessary if, for example, nitrogen were mixed with the hydrogen in pipe 11 are eliminated. Also, steam can be introduced into a lower portion of chamber 6, above valve 4', below valve 4', or any combination thereof to purge the particulate material of combustion gases and other undesired, entrained gases.

Carbonaceous material which is to be reacted in chamber 1 can be introduced into chamber 1 by a pipe (not shown) and/or into first conduit 2 by pipe 12. The water reactant, for example in the form of steam, can be introduced into chamber 1 by way of pipe 10. It is preferred that at least part of the steam be introduced into a lower portion of chamber 1 to thereby provide contacting of the steam with the downwardly moving particulate material and carbonaceous material from pipe 12 and to also fluidize the bed of reactants and particulate material 13 in chamber 1.

A mixture of particulate material and ash from the reaction are removed from chamber 1 into second conduit 3 for reheating in chamber 5. The ash can be separated from the particulate material by and with the gas in chamber 6. In this manner ash and gas pass out, for example, vent means 9 of FIG. 2. Other ash separation means obvious to those skilled in the art can be employed in conduit 3 or chambers 1 or 6.

The process of this invention can be carried out at substantially any pressure and/or temperature which will produce the desired reaction of carbon with water to produce the desired reaction of carbon with water to produce carbon monoxide and hydrogen or the thermal cracking of a hydrocarbon to produce, inter alia, hydrogen. These reaction parameters will vary widely depending upon the particular reactants employed, the particulate material employed, the apparatus employed, and the like. Generally, the temperature will be at least about 1,200° F. in the reaction chamber or zone and the pressure will be above ambient in the entire system, e.g. at least about 5 p.s.i.g. The temperature of the reactants and particulate material in chamber 5 will vary from the lower portion of chamber 5 to the upper portion thereof but the temperature gradient should be adjusted so that the temperature of the material issuing from chamber 5 into accumulation chamber 6, or into first conduit 2 if there is no accumulation chamber, should be above the desired reaction temperature for chamber 1. Thus, the highest temperature achieved in chamber 5 will be higher than the temperature normally obtained in chamber 1.

The mixture of carbonaceous material or hydrocarbon and water in chamber 1 will be about a 1 to 1 mole ratio although excesses of either the carbonaceous material or hydrocarbon or the water can be employed so that a general range of carbonaceous material or hydrocarbon to water would be from about 0.05/1 to about 1/0.05.

If desired, at least part of the flue gas from vent 9 can be recycled to chamber 5 to decrease the oxygen therein.

The amount of fluidizing-oxidizing gas employed will vary widely. It should be noted here that the fluidizing and oxidizing gas can be two separate gases introduced into chamber 5 by two or more separate pipes if desired but, generally, air or some other oxygen-containing gas can be employed most efficiently as the fluidizing gas as well as for its oxidizing characteristics. The amount of such gas employed will vary widely depending upon the composition of the particulate material and its degree of subdivision but will generally be that which is sufficient to fluidize the particulate material in chamber 5 and convey the same upward to the end of chamber 5 as well as that which is sufficient to oxidize the amount of carbonaceous material introduced by pipe 8 and any other pipes at least to carbon monoxide and preferably, on to carbon dioxide.

The amount of carbonaceous material introduced by pipe 8 or other pipes associated with chamber 5 or conduit 7 will be that which gives sufficient combustion heat as the carbon in the carbonaceous material is oxidized to heat the particulate material in chamber 5 to the desired temperature before introduction of the particulate material into chamber 1.

Figure 2:
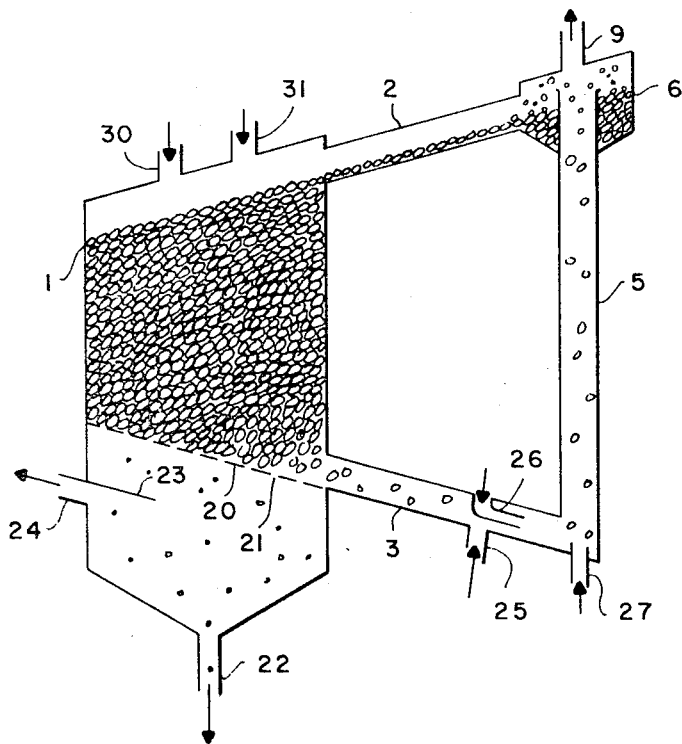
FIG. 2 shows another form of apparatus which also embodies this invention.

FIG. 2 shows the reaction chamber 1 operatively connected in its lower portion by way of second conduit 3 to the lower portion of conveying-heating chamber 5. The upper portion of chamber 5 contains an accumulation chamber 6 which is operatively connected to an upper portion of chamber 1 by way of conduit 2.

It should be noted that the apparatus of FIGS. 1 and 2 employs a closed conveying-heating chamber 5 as well as closed conduits 2 and 3 between chambers 1 and 5. This also provides thermal conservation.

Chamber 1 has a grate means 20 therein which is slanted at substantially the same angle as conduit 3 so as to aid in gravity feeding of particulate material from the lower portion of chamber 1 into conduit 3. The openings 21 in grate 20 are sufficiently restricted in size to retain the particulate material while allowing ash and reaction product water gas to pass therethrough. The ash falls to the bottom of chamber 1 and is removed by way of pipe 22. The water gas reaction product passes underneath baffle means 23 and out of chamber 1 by way of pipe 24.

The particulate material then passes by gravity feed, as in FIG. 1, through conduit 3 into a lower portion of chamber 5 to be fluidized, heated, and conveyed upward for reintroduction into chamber 1.

It should be noted that although FIGS. 1 and 2 show conduits 2 and 3 to be adapted to move their contents from one chamber to the other by gravity feeding, mechanical or other types of pumping means can be employed in these conduits or upstream thereof to move their contents therethrough. For example, although conduit 2 is shown in FIG. 1 to be substantially vertical and in FIG. 2 to slope downwardly from chamber 6 to chamber 1 thereby providing for gravity feeding of particulate material from chamber 6 to chamber 1, conduit 2 could be horizontal or even inclined upwardly from chamber 6 and particulate material moved through conduit 2 by means of a mechanical or other type of pumping means or solids flow control device disposed in conduit 2 or in accumulation chamber 6. The same reasoning applies to conduit 3 and the movement of its contents from chamber 1 to chamber 5. It is desirable to have a solids flow control device such as a star wheel feeder in conduit 3 and to allow for gravity feeding through conduit 2.

A pipe 25 is operatively connected to conduit 3 for the introduction of steam or other material into conduit 3 to move in conduit 3 toward chamber 1 thereby providing a dynamic-type seal to prevent air or other gas from traveling from chamber 5 through conduit 3 into chamber 1. This seal can be supplemented by the use of pipe 26 which is oriented so as to introduce material therethrough (e.g., carbonaceous fuel, steam, and the like) toward a lower portion of chamber 5.

Fluidizing and/or oxidizing gas can be introduced into a lower portion of chamber 5 by way of pipe 27. As explained for the apparatus of FIG. 1, other pipes can be employed in conduit 3 and chamber 5 for the introduction of other material such as steam or carbonaceous material or hydrocarbon and for the separate introduction of fluidizing and oxidizing gases if desired. The particulate material in the lower portion of chamber 5 is thus fluidized and mixed with carbonaceous material and oxidizing gas so that while being conveyed upwardly in chamber 5 the carbonaceous material is burned to carbon dioxide and the particulate material heated.

The heated particulate material is separated from its associated gases in chamber 6, the gases removed by vent pipe 9, and the particulate material passed through conduit 2 into chamber 1. A solids-gas separator can be used with vent pipe 9 as shown in FIG. 1. If desired, pipes can be operatively connected to conduit 2 to pass a purging gas such as steam and the like into conduit 2 toward vent pipe 9 to ensure that none of the gas in chamber 6 passes into chamber 1. Additionally, the amount of gas removed by vent pipe 9 can be controlled to establish a flow of purging gas from chamber 1 to conduit 2 and to vent pipe 9 thereby eliminating the need for an additional pipe connected to conduit 2 to introduce a gas into conduit 2 to act as a purge gas for vent pipe 9.

Pipes 30 and 31 are operatively connected to chamber 1 for introducing reactants, e.g., carbonaceous material or hydrocarbon and steam, into chamber 1 for the reaction to produce hydrogen. As with the apparatus of FIG. 1, the reactants can be introduced into the upper portion of chamber 1 as shown in FIG. 2 or into a lower portion of chamber 1 such as just above grate 20 or both or in any obvious combination or variation so long as these reactants are fed into the interior chamber 1 at one or more places in the upper and/or lower portions of that chamber. It can be advantageous when the water reactant is steam to introduce at least part of the steam in a lower portion of chamber 1 for partial fluidization and countercurrent contacting.

Modifications and variations of the apparatus shown as would be obvious to those skilled in the art can be made in accordance with this invention. For example, solid material being fed into and removed from the apparatus (e.g. ground carbonaceous material being fed into the reaction chamber, conveying-heating chamber, and/or second conduit means and the ash removed from the reaction chamber) can all be fed through or removed through conventional lock hoppers to prevent the admission of air to the apparatus. Similarly, grate 20 in FIG. 2 can be made vibrational or otherwise movable to facilitate the separation of the ash from the particulate material. Also, the size of the particulate material particles should be adjusted in relation to the interior cross-sectional diameter of chamber 5 as taken perpendicular to its longitudinal axis so that bridging of that chamber by an aggregation of particulate material particles is avoided. For example, to avoid bridging, the average cross-sectional diameter for chamber 5 can be at least five times the average diameter of the average-size particle. The water gas reaction product issuing from the reaction chamber, the products being carbon monoxide and hydrogen in accompaniment with some steam, are passed to conventional apparatus for converting the carbon monoxide to carbon dioxide and separation of the carbon dioxide and steam from the hydrogen and therefore the separate recovery of hydrogen by itself for use in various processes such as the hydrogenation of materials such as hydrogen deficient hydrocarbons and the like.

By way of example, a process according to this invention is carried out in the apparatus substantially as shown in FIG. 1 using sand having an average particle size of minus 50 and plus 60 mesh (U.S. Standard sieves) as the inert, particulate heat exchange medium.

Ground coal char is utilized as the carbonaceous material and is introduced into the system through both pipes 8 and 12.

Steam is introduced into the system through pipe 10 and air in pipe 7 is utilized as the oxidizing-fluidizing gas for lifting the sand and coal char mixture upwardly in chamber 5 to accumulator 6.

By the time the mixture of sand, coal char, and air reach accumulator 6, the mixture is at a temperature of about 2,000° F.

Pipe 9 removes from accumulator 6 nitrogen, ash, and the combustion gases from the coal char as it burns in chamber 5.

Heated sand settles to the bottom of accumulator 6 and passes downwardly through conduit 2 and valve 4 into fluidized bed 13 in reaction chamber 1.

Bed 13 of reaction chamber 1 is substantially at 1,800° F. and is constantly subsiding as the lower portion thereof continuously passes through conduit 3 and valve 4 into chamber 5.

Pipe 11 continuously removes from chamber 1 a gas mixture containing hydrogen and carbon monoxide which is passed to conventional apparatus for converting the carbon monoxide to carbon dioxide and separating the carbon dioxide from the hydrogen. The apparatus is operated at an average pressure of about 10 p.s.i.g. and the air admitted through pipe 7 is compressed to a pressure and admitted to pipe 7 in a volume sufficient to maintain this pressure in relation to the pressure injected into the system by steam pipe 10, and to oxidize the carbonaceous material introduced by pipe 8 substantially to carbon dioxide by the time it reaches accumulator 6, and to raise the amount of solid material in chamber 5 from the lower portion thereof to accumulator 6.

Reasonable variations and modifications are possible within the scope of this disclosure without departing from the spirit and scope of this invention.

The embodiments of the invention in which an exclusive property or privilege is claimed are defined as follows:

1. Apparatus comprising a reaction chamber having upper and lower portions, a closed conveying-heating chamber having upper and lower portions, first conduit means operatively connecting said reaction and conveying-heating chambers, second conduit means operatively connecting said reaction and conveying-heating chambers, said first conduit means being adapted to move its contents from said conveying-heating chamber to said reaction chamber, said second conduit means being adapted to move its contents from said reaction chamber to said conveying-heating chamber, inert particulate material for circulation through both said chambers and both said conduit means as a heat exchange medium, means for introducing reactants into said reaction chamber, means for removing reaction products from said reaction chamber, means for introducing reactants and a fluidizing fluid into the lower portion of said conveying-heating chamber, and means for preventing gases in either chamber from passing through either conduit means into the other chamber comprising vent means for removing gas from the upper portion of said conveying-heating chamber, a pipe operatively connected to said second conduit means to introduce fluid into said second conduit means toward said reaction chamber, and a separate pipe to introduce fluid into said second conduit means toward said conveying-heating chamber.

2. Apparatus according to claim 1 wherein said means for introducing reactants into said reaction chamber comprises at least one conduit means operatively connected to at least one of the upper and lower portions of said reaction chamber, said means for removing reaction products from said reaction chamber comprises at least one conduit means operatively connected to at least one of the upper and lower portions of said reaction chamber, said first conduit means is adapted to move its contents downwardly from said conveying-heating chamber to said reaction chamber to provide for gravity feeding of material from said conveying-heating chamber to said reaction chamber, said second conduit means is adapted to move its contents downwardly from said reaction chamber to said conveying-heating chamber to provide for gravity feeding of material from said reaction chamber to said conveying-heating chamber, said means for introducing reactants and a fluidizing fluid into said conveying-heating chamber comprises at least one conduit means for introducing said reactants into said conveying-heating chamber and at least one separate conduit means for introducing fluidizing fluid.

3. Apparatus according to claim 2 wherein valve means are carried by each said first and second conduit means to help regulate the flow of material therethrough.

4. Apparatus according to claim 2 wherein said reaction chamber and conveying-heating chamber are upright and substantially side by side, a grate means in the lower portion of said reaction chamber to separate said reaction product from said particulate material, said grate means being in alignment with said second conduit means and tilted to aid in gravity feeding of said particulate material from said reaction chamber into said second conduit means, said conduit means for removing reaction products being connected to said reaction chamber below said grate means.

5. Apparatus according to claim 2 wherein said reaction chamber and conveying-heating chamber are upright and substantially side by side, said conveying-heating chamber having a vented accumulation chamber in operative connection between the upper portion of said conveying-heating chamber and said first conduit means, said accumulator chamber being above said reaction chamber to thereby collect heated particulate material to be fed downward into said second conduit means and separate gas from said heated particulate material before feeding same through said second conduit means into said reaction chamber.

6. In a hydrogen production method wherein carbon is reacted in a reaction zone with water to form in part hydrogen and carbon monoxide or a hydrocarbon is thermally cracked in a reaction zone to form in part hydrogen, the heat transfer medium for the reaction being an inert particulate material, the improvement comprising conveying said particulate material to said reaction zone by fluidizing said particulate material with gas, at least part of said fluidizing gas being an externally supplied oxidizing gas and an externally supplied carbonaceous fuel material, heating the fluidized mixture to burn said externally supplied carbonaceous fuel material and to heat said particulate material while it is being conveyed to said reaction zone, said heating of said particulate material during conveyance being sufficient so that the heated particulate material is charged directly to the reaction zone without further heating, and separating the gases associated with the heated particulate material including entrained gases before the heated particulate material is introduced into the reaction zone.

7. A method according to claim 6 wherein said fluidizing gas is said oxidizing gas and said oxidizing gas is air, carbonaceous fuel material is burned substantially to form carbon dioxide, and at least the nitrogen gas present with the heated particulate material is separated by venting before the heated particulate material is introduced into the reaction zone thereby avoiding mixing nitrogen from the air with the hydrogen formed in the reaction zone.

8. A method according to claim 7 wherein said carbonaceous fuel material is the same material used as the carbon source in said reaction zone.

9. A method according to claim 7 wherein the carbon source is one of coal, coke, coal char, and mixtures of two or more thereof.

10. A method according to claim 6 wherein said particulate material is recovered from said reaction zone and conveyed by said fluidizing step to another portion of said reaction zone for reintroduction thereinto after heating by said burning of carbonaceous fuel material.

11. A method according to claim 6 wherein a hydrocarbon having from 1 to 10, inclusive, carbon atoms per molecule is thermally cracked in said reaction zone, and said oxidizing gas is air.

12. A method according to claim 6 wherein the reaction is carried out at a temperature of at least about 1,200° F. and a pressure of at least about 5 p.s.i.g. using carbon source to water ratio range of from about 0.05/1 to about 1/0.05.

* * * * *